July 2, 1940.
J. C. GORDON
2,206,088
METHOD OF MAKING DIES
Original Filed Dec. 27, 1938
2 Sheets—Sheet 1
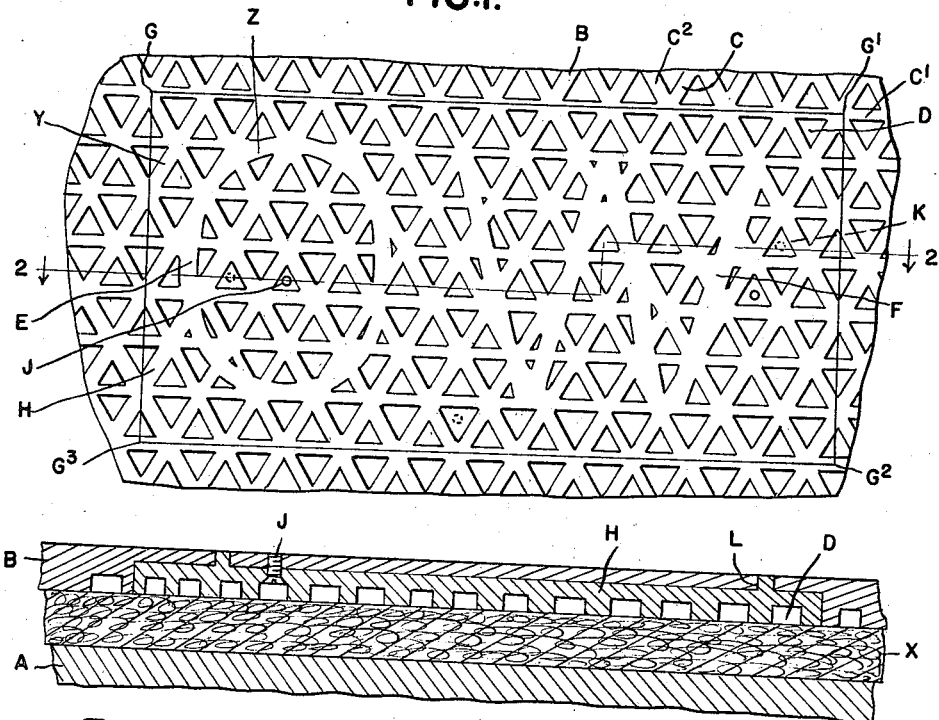
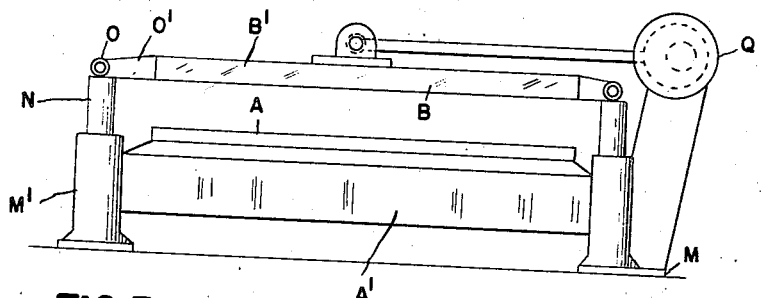
INVENTOR.
JACK C. GORDON
BY
ATTORNEYS July 2, 1940.　　　　　J. C. GORDON　　　　2,206,088
METHOD OF MAKING DIES
Original Filed Dec. 27, 1938　　2 Sheets-Sheet 2

INVENTOR.
JACK C. GORDON
BY
ATTORNEYS

Patented July 2, 1940

2,206,088

UNITED STATES PATENT OFFICE 2,206,088

METHOD OF MAKING DIES

Jack C. Gordon, Detroit, Mich., assignor to Allen Industries, Inc., Detroit, Mich., a corporation of Delaware Original application December 27, 1938, Serial No. 247,999. Divided and this application March 6, 1939, Serial No. 260,244

9 Claims. (Cl. 101—401.1)

This invention relates generally to the manufacture of dies and exchangeable inserts for intaglio patterned platens designed for use in the manufacture of under-padding such as that used beneath carpets and other floor coverings to furnish a cushion support therefor, and constitutes a division of my application filed December 27, 1938, bearing Serial No. 247,999.

One of the essential objects of the invention is to make the dies or inserts in such a way that they have two intaglio designs or patterns, one forming a continuation of the intaglio design of the platen so as to make no break in the continuity thereof in the surface of the product, and the second being preferably embodied in the first mentioned intaglio design to produce in the product an identifying trade-mark.

Another object is to provide a method of this type that can be practiced at a minimum cost.

Other objects, advantages and novel details of construction of this invention will be made more apparent as this description proceeds, especially when considered in connection with the accompanying drawings, wherein:

Figure 1 is a bottom plan view of a portion of one of the platens for forming my improved underpadding;

Figure 2 is a cross section on line 2—2 of Figure 1, showing the platen in cooperative relation to the opposed platen;

Figure 3 is a side elevation of the complete machine for forming the under-padding, showing the upper platen raised for the insertion or withdrawal of the work;

As shown in Figure 2, A is the base platen and B the upper platen of the under-padding forming machine. The platen B is formed with the intaglio design, which as shown in Figure 1, is formed by three sets of parallel grooves C, C' and C² intersecting to leave triangular projections D therebetween. Only a small portion of this platen is shown in Figure 1, but it is to be understood that the same design continues throughout its extent.

To produce the identifying characteristic, a small portion of the area of the platen B is formed with an additional intaglio design. Thus, as shown in Figure 1, the letters "O" and "W" are formed by the cutting of additional grooves E and F. These do not in any way obstruct the continuity of the grooves C, C' and C², but further cut away some of the intermediate projections D.

In the use of the apparatus for manufacturing the product, it is desirable to be able to change the character of the identifying marking without otherwise altering the machine. This I accomplish by cutting away a portion of the patterned surface of the platen and providing exchangeable inserts for filling this recess. These inserts are so fashioned as to form a continuation of the geometrical itaglio design so as to make no break in the continuity thereof in the surface of the product. However, the insert is further provided with the grooves, such as E and F forming the identifying mark. To facilitate the exact formation of this insert, the cut-away area is between similar points in the pattern, as for instance the centers of intersection of the three sets of grooves C, C' and C². In Figure 1, the corners of this recess are G, G', G² and G³, and the lines therebetween form a rectangle. The insert H may be fashioned by first placing the blank in a jig I having a patterned margin corresponding to the margin around the recess. The blank is then cut to form a continuation of this pattern, and also cut to form an identifying pattern therein. The insert H may be secured within the recess in the platen B by suitable means, such as screws J, the heads of which are in the bottoms of certain of the grooves. Also, dowels K are non-symmetrically arranged to project from the bottom of the insert and to engage corresponding sockets L in the platen. These insure the proper placing of the insert by rendering it impossible for it to engage the recess in any other way.

With the apparatus constructed as described, the oscillation of the platen B simultaneously with the application of downward pressure thereon, will distribute the fibers of a mass such as X between the platens so as to produce not only the geometrical pattern Y, but also the identifying mark Z.

Figure 4:
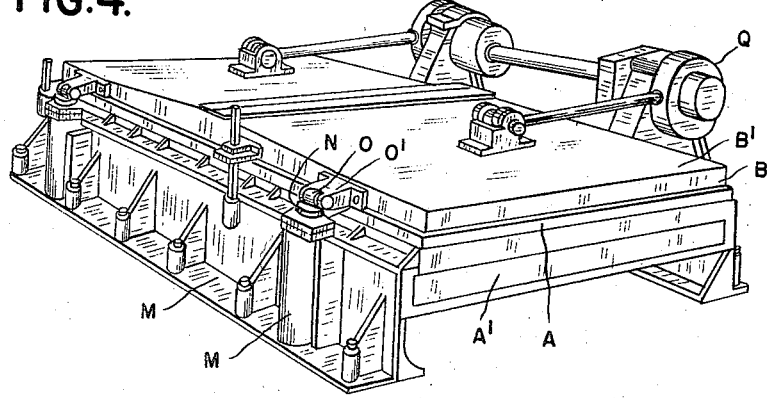
Figure 4 is a perspective view of the machine with the upper platen lowered and resting upon the work.
Figure 5:
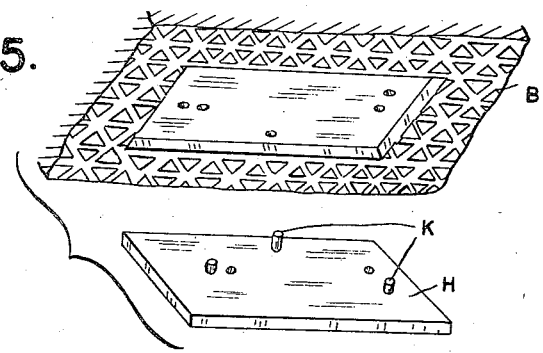
Figure 5 is a perspective view of a portion of the platen having the recess therein and the insert for engaging said recess showing the non-symmetrical arrangement of the dowels.
Figure 6:
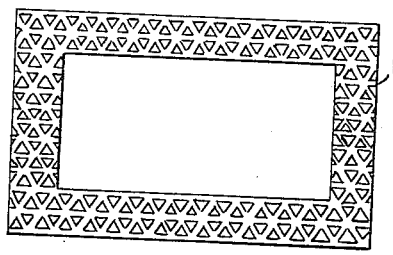
Figure 6 is a diagrammatic plan view of the jig in which the insert is placed for cutting the intaglio pattern therein.

My improvements may be used in any standard type of machine designed for felting under-padding, such as illustrated in Figures 3 and 4. This machine which is not my invention comprises in general a bed M for supporting the base platen A', said bed being mounted on suitable standards M'. The movable platen B' is raised or lowered with respect to the base platen A', through the medium of hydraulic jacks N on opposite sides thereof. These engage rollers O on arms O' projecting from the sides of the platen B', which permit of an oscillating movement. This oscillating movement is imparted through the medium of pitman rods centrally pivoted to the platen B' and at their outer ends connected with a suitable crank or eccentric within housings Q mounted on the bed M. Thus by means of the jacks the platen B' is raised for the insertion of the material to be felted, after which the jacks are lowered and the platen simultaneously oscillated as heretofore described.

What I claim as my invention is:

1. The method of forming exchangeable inserts for recesses in intaglio patterned platens, including the steps of forming a jig with a recess corresponding to a recess in a patterned platen and with a patterned margin corresponding to the patterned margin around a recess in the platen, placing a blank insert in the recess in the jig, forming in said blank insert an intaglio pattern constituting a continuation of the patterned margin of the jig, and forming in the intaglio pattern just mentioned an intaglio pattern of an identifying trade-mark.

2. The method of forming exchangeable inserts for recesses in intaglio patterned platens, including the steps of forming a jig with a recess corresponding to a recess in a patterned platen and with a patterned margin corresponding to the patterned margin around a recess in the platen, placing a blank insert in the recess in the jig, and forming in said blank two intaglio patterns, one forming a continuation of the patterned margin of the jig, and the other being a design of an identifying trade-mark.

3. The method of forming exchangeable inserts for recesses in intaglio patterned platens, including the steps of forming a jig with a recess corresponding to a recess in a patterned platen and with a patterned margin corresponding to the patterned margin around a recess in the platen, placing a blank insert in the recess in the jig, and forming in said blank two intaglio patterns, one being a design of an identifying trade-mark.

4. The method of forming exchangeable inserts for recesses in intaglio patterned platens, including the steps of forming a jig with a recess corresponding to a recess in a patterned platen and with a patterned margin corresponding to the patterned margin around a recess in the platen, placing a blank insert in the recess in the jig, and forming in said blank two intaglio patterns, one forming a continuation of the patterned margin of the jig.

5. The method of forming exchangeable inserts for recesses in platens, the margins of said recesses having alternate projecting and depressed portions, including the steps of forming a jig with a recess corresponding to a recess in a platen and providing the jig at the margin of the recess with alternate projecting and depressed portions corresponding to the projecting and depressed portions of the platen, placing a blank insert in the recess in the jig, cutting in the blank insert grooves of predetermined configuration to form projecting and depressed portions constituting a continuation of the projecting and depressed portions of the jig, and cutting certain of the projecting portions on the blank to provide an intaglio pattern of an identifying trade-mark.

6. The method of forming exchangeable inserts for recesses in platens, the margins of said recesses having intersecting grooves and small projections therebetween constituting an intaglio pattern, including the steps of forming a jig with a recess corresponding to a recess in a platen and with a margin having intersecting grooves and small projections therebetween constituting an intaglio pattern corresponding to the patterned margin around a recess in the platen, placing a blank insert in the recess in the jig, cutting in the blank insert one set of grooves of predetermined configuration to provide an intaglio pattern forming a continuation of the patterned margin of the jig, and cutting certain of the projections aforesaid on the blank insert to provide an intaglio pattern of an identifying trade-mark.

7. The method of forming exchangeable inserts for intaglio patterned platens comprising, the forming of a jig with a recess corresponding to a recess in a patterned platen and with an intaglio geometrical pattern in the margin surrounding the recess corresponding to the pattern surrounding the recess of the platen, placing a blank in the recess in said jig, cutting an intaglio pattern in the blank forming a continuation of the pattern in the margin of the jig, and cutting an additional intaglio pattern in the blank constituting an identification mark.

8. The method of forming exchangeable inserts for recesses in intaglio patterned platens, including the steps of forming a jig with a recess corresponding to a recess in a patterned platen and with a patterned margin corresponding to the patterned margin around a recess in the platen, placing a blank insert in the recess in the jig, and forming in said blank insert an intaglio pattern constituting a continuation of the patterned margin of the jig.

9. The method of forming exchangeable inserts for recesses in intaglio patterned platens, including the steps of forming a jig with a recess corresponding to a recess in a patterned platen and with a patterned margin corresponding to the patterned margin around a recess in the platen, placing a blank insert in the recess in the jig, and forming in said blank an intaglio pattern, a part of the intaglio pattern in the blank forming a continuation of the patterned margin of the jig.

JACK C. GORDON.